(12) United States Patent
Turner et al.

(10) Patent No.: US 6,449,068 B1
(45) Date of Patent: Sep. 10, 2002

(54) OPTICAL POWER MANAGED NETWORK NODE FOR PROCESSING DENSE WAVELENGTH DIVISION MULTIPLEXED OPTICAL SIGNALS

(75) Inventors: Ian Turner, Stratham; William L. Emkey, Windham, both of NH (US); Robert K. Wade, Boca Raton, FL (US)

(73) Assignee: LightChip, Inc., Salem, NH (US)

(*) Notice: Subject to any disclaimer, the term of this patent is extended or adjusted under 35 U.S.C. 154(b) by 0 days.

(21) Appl. No.: 09/799,070

(22) Filed: Mar. 6, 2001

Related U.S. Application Data
(60) Provisional application No. 60/187,101, filed on Mar. 6, 2000.

(51) Int. Cl.[7] .............................................. H04B 10/08
(52) U.S. Cl. ...................... 359/110; 359/133; 359/134; 359/187; 359/161; 359/127; 359/128; 359/124; 359/177
(58) Field of Search ................................ 359/110, 133, 359/134, 187, 177, 124, 127, 128, 161

(56) References Cited

U.S. PATENT DOCUMENTS

| | | | | |
|---|---|---|---|---|
| 5,225,922 A | * | 7/1993 | Chraplyvy et al. | 359/124 |
| 5,374,973 A | * | 12/1994 | Maxham et al. | 359/341 |
| 5,612,805 A | * | 3/1997 | Fevrier et al. | 359/124 |
| 5,675,432 A | * | 10/1997 | Kosaka | 359/341 |
| 5,812,710 A | * | 9/1998 | Sugaya | 385/27 |
| 5,969,840 A | * | 10/1999 | Roberts | 359/161 |
| 5,999,290 A | * | 12/1999 | Li | 359/127 |
| 6,031,647 A | * | 2/2000 | Roberts | 359/161 |
| 6,040,933 A | * | 3/2000 | Khaleghi et al. | 359/124 |
| 6,101,012 A | * | 8/2000 | Danagher et al. | 359/127 |
| 6,115,157 A | * | 9/2000 | Barnard et al. | 359/124 |
| 6,134,034 A | * | 10/2000 | Terahara | 359/124 |
| 6,208,441 B1 | * | 3/2001 | Jones et al. | 359/127 |
| 6,236,487 B1 | * | 5/2001 | Stephens | 359/161 |
| 6,262,821 B1 | * | 7/2001 | Fevrier et al. | 359/127 |
| 6,320,684 B2 | * | 11/2001 | Uehara | 359/124 |

* cited by examiner

*Primary Examiner*—Leslie Pascal
*Assistant Examiner*—Hanh Phan
(74) *Attorney, Agent, or Firm*—Hunton & Williams

(57) ABSTRACT

A technique for processing dense wavelength division multiplexed optical signals in a network node is disclosed. In one embodiment, the technique is realized as an optical power managed network node comprising a dense wavelength division multiplexing device for combining a plurality of narrowband optical signals into a multiplexed polychromatic optical signal. The optical power managed network node also comprises a wavelength-selective optical power detector for detecting the power of each of the plurality of narrowband optical signals combined into the multiplexed polychromatic optical signal. The optical power managed network node further comprises a plurality of attenuators for attenuating the power of at least one of the plurality of narrowband optical signals based upon the detected power of each of the plurality of narrowband optical signals.

23 Claims, 2 Drawing Sheets

OPTICAL POWER MANAGED NETWORK NODE FOR PROCESSING DENSE WAVELENGTH DIVISION MULTIPLEXED OPTICAL SIGNALS

CROSS-REFERENCE TO RELATED APPLICATIONS

This patent application claims priority to U.S. Provisional Patent Application No. 60/187,101, filed Mar. 6, 2000, which is hereby incorporated by reference herein in its entirety.

This patent application is related to U.S. patent application Ser. No. 09/578,721, filed May 26, 2000, which is hereby incorporated by reference herein in its entirety.

FIELD OF THE INVENTION

The present invention relates generally to dense wavelength division multiplexing networks and, more particularly, to an optical power managed network node for processing dense wavelength division multiplexed optical signals.

BACKGROUND OF THE INVENTION

Dense wavelength division multiplexing (DWDM) networks typically comprise a plurality of network nodes for receiving and transmitting dense wavelength division multiplexed optical signals. Each of the plurality of network nodes typically allows an individual optical signal that is contained in a received dense wavelength division multiplexed optical signal to either simply pass through the network node and then be transmitted further along the network from the network node, or be "dropped" at the network node for use by one or more sub-nodes connected to the network node. Each of the plurality of network nodes also typically allows one or more individual optical signals to be "added" to the network at the network node. These "added" optical signals are typically transmitted further along the network from the network node along with other optical signals that are received at the network node, but are not "dropped" at the network node. The above-described network node is generally referred to as an optical add/drop network node due to the "adding" and "dropping" functions performed by the network node.

The "adding" and "dropping" functions performed by most existing optical add/drop network nodes typically result in a difference between the power of a dense wavelength division multiplexed optical signal that is received at the optical add/drop network node and the power of a dense wavelength division multiplexed optical signal that is transmitted from the optical add/drop network node. For example, if more optical signals are "dropped" at the optical add/drop network node than are "added" at the optical add/drop network node, then the power of the dense wavelength division multiplexed optical signal that is received at the optical add/drop network node will typically be more than the power of the dense wavelength division multiplexed optical signal that is transmitted from the optical add/drop network node.

Also, most existing optical add/drop network nodes typically inflict some degree of loss upon the power of the optical signals that are received at each network node. That is, an optical add/drop network node typically receives a dense wavelength division multiplexed optical signal in multiplexed form, and then demultiplexes the received dense wavelength division multiplexed optical signal in order for the individual optical signals that are contained within the received dense wavelength division multiplexed optical signal to be processed by the optical add/drop network node. Also, the processing of the individual optical signals at an optical add/drop network node typically comprises switching the individual optical signals such that the individual optical signals are either passed through the optical add/drop network node or "dropped" at the optical add/drop network node. Further, the individual optical signals that are passed through the optical add/drop network node are recombined (i.e., multiplexed) prior to being transmitted further along the network from the optical add/drop network node. All of the above-described demultiplexing, switching, and multiplexing functions typically inflict some degree of loss upon the power of the optical signals that are received at the optical add/drop network node.

The above-described multiplexing function losses that are inflicted upon the power of the optical signals that are received at the optical add/drop network node are also typically inflicted upon the power of any optical signals that are "added" to the network at the optical add/drop network node. That is, optical signals that are "added" to the network at the optical add/drop network node are combined (i.e., multiplexed) with optical signals that are otherwise received at the optical add/drop network node, and a resulting dense wavelength division multiplexed optical signal is transmitted further along the network from the optical add/drop network node. Thus, optical signals that are "added" to the network at the optical add/drop network node are also typically subject to multiplexing function losses.

Furthermore, optical signals that are "added" to a network at most existing optical add/drop network nodes typically have a power level that is different from the optical signals that are otherwise received at the optical add/drop network node. This difference in power between "added" optical signals and optical signals that are otherwise received at the optical add/drop network node typically effects the power of the resulting dense wavelength division multiplexed optical signal that is transmitted further along the network from the optical add/drop network node. For example, if the power of "added" optical signals is greater than the power of optical signals that are otherwise received at the optical add/drop network node, then the power of the resulting dense wavelength division multiplexed optical signal that is transmitted further along the network from the optical add/drop network node is typically greater than the power of the dense wavelength division multiplexed optical signal that is initially received at the optical add/drop network node.

Additionally, differences in power between "added" optical signals and optical signals that are otherwise received at most existing optical add/drop network nodes can cause problems such as, for example, channel crosstalk, in the resulting dense wavelength division multiplexed optical signal that is transmitted further along the network from the optical add/drop network node. That is, when "added" optical signals are combined (i.e., multiplexed) with optical signals that are otherwise received at the optical add/drop network node, the higher power optical signals often interfere with the lower power optical signals.

All of the above-described power related problems associated with existing optical add/drop network nodes require an operator of a network to continually perform some type of manual network initialization procedure whenever additional optical signals are added to the network, existing optical signals are dropped from the network, or the network is otherwise reconfigured in some manner (e.g., an additional optical add/drop network node is added to the network, an existing optical add/drop network node is removed from the network, etc.). That is, a network operator typically has to perform such a manual network initialization procedure whenever a change occurs in the network such that there is a corresponding change in the power of a dense wavelength division multiplexed optical signal that is transmitted from an optical add/drop network node. Such a change in the power of a dense wavelength division multiplexed optical signal that is transmitted from an optical add/drop network node is seen at every subsequent optical add/drop network node that receives this same dense wavelength division multiplexed optical signal either directly or after all or a portion of this same dense wavelength division multiplexed optical signal propagates through one or more subsequent optical add/drop network nodes. Thus, a network operator typically has to perform a manual network initialization procedure on most, if not all, optical add/drop network nodes in the network so that these optical add/drop network nodes can accommodate the change in the power of every received dense wavelength division multiplexed optical signal.

Obviously, the above-described manual network initialization procedure can be costly in terms of both time spent by a network operator and the cost of optical power measurement and adjustment equipment. Thus, it would be desirable to provide a technique for overcoming the above-described inadequacies and shortcomings of existing optical add/drop network nodes. More particularly, it would be desirable to provide an optical power managed network node for processing dense wavelength division multiplexed optical signals in an efficient and cost effective manner.

OBJECTS OF THE INVENTION

The primary object of the present invention is to provide an optical power managed network node for processing dense wavelength division multiplexed optical signals in an efficient and cost effective manner.

The above-stated primary object, as well as other objects, features, and advantages, of the present invention will become readily apparent to those of ordinary skill in the art from the following summary and detailed descriptions, as well as the appended drawings. While the present invention is described below with reference to preferred embodiment (s), it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

SUMMARY OF THE INVENTION

According to the present invention, a technique for processing dense wavelength division multiplexed signals in a network node is provided. In one exemplary embodiment, the technique is realized as an optical power managed network node comprising a demultiplexing device for separating a first multiplexed polychromatic optical signal into a first plurality of narrowband optical signals. The optical power managed network node also comprises a switching device for switching the first plurality of narrowband optical signals according to a predetermined signal routing scheme so as to generate a second plurality of narrowband optical signals. The optical power managed network node further comprises a plurality of attenuators for attenuating the power of at least one of the second plurality of narrowband optical signals so as to generate a plurality of attenuated narrowband optical signals, wherein the power of the at least one of the second plurality of narrowband optical signals is attenuated based upon a power level of each of the plurality of attenuated narrowband optical signals. The optical power managed network node still further comprises a dense wavelength division multiplexing device for combining the plurality of attenuated narrowband optical signals into a second multiplexed polychromatic optical signal. The optical power managed network node additionally comprises a wavelength-selective optical power detector for detecting the power level of each of the plurality of attenuated narrowband optical signals combined into the second multiplexed polychromatic optical signal.

In accordance with other aspects of this exemplary embodiment of the present invention, the at least one of the second plurality of narrowband optical signals is beneficially attenuated so as to equalize the power in each of the second plurality of narrowband optical signals.

In accordance with further aspects of this exemplary embodiment of the present invention, the optical power managed network node further beneficially comprises an adjustable power amplifier for adjustably amplifying the power of the second multiplexed polychromatic optical signal based upon the detected power level of each of the plurality of attenuated narrowband optical signals.

In accordance with still further aspects of this exemplary embodiment of the present invention, the second plurality of narrowband optical signals comprises at least a portion of the first plurality of narrowband optical signals. That is, at least one of the first plurality of narrowband optical signals may beneficially be switched such that the at least one switched narrowband optical signal is routed through the optical power managed network node. Also, at least one other of the first plurality of narrowband optical signals may beneficially be switched such that the at least one switched narrowband optical signal is routed to a local sub-node. Further, the switching device may beneficially receive at least one of a third plurality of narrowband optical signals for routing through the optical power managed network node. Thus, the second plurality of narrowband optical signals comprises those of the first plurality of narrowband optical signals and the third plurality of narrowband optical signals that are routed through the optical power managed network node. It should be noted that the optical power managed network node may further beneficially comprise a controller for controlling the power of the at least one of the third plurality of narrowband optical signals based upon the detected power level of each of the plurality of attenuated narrowband optical signals.

In accordance with still further aspects of this exemplary embodiment of the present invention, the wavelength-selective optical power detector also beneficially detects the power level of each of the first plurality of narrowband optical signals contained within the first multiplexed polychromatic optical signal. Alternatively, wherein the wavelength-selective optical power detector is a first wavelength-selective optical power detector, the optical power managed network node may further beneficially comprise a second wavelength-selective optical power detector for detecting the power level of each of the first plurality of narrowband optical signals contained within the first multiplexed polychromatic optical signal.

In another exemplary embodiment, the technique is realized as a method for processing dense wavelength division multiplexed signals in an optical power managed network node. The method comprises separating a first multiplexed polychromatic optical signal into a first plurality of narrowband optical signals. The method also comprises switching the first plurality of narrowband optical signals according to a predetermined signal routing scheme so as to generate a second plurality of narrowband optical signals. The method further comprises attenuating the power of at least one of the second plurality of narrowband optical signals so as to generate a plurality of attenuated narrowband optical signals, wherein the power of the at least one of the second plurality of narrowband optical signals is attenuated based upon a power level of each of the plurality of attenuated narrowband optical signals. The method still further comprises combining the plurality of attenuated narrowband optical signals into a second multiplexed polychromatic optical signal. The method additionally comprises detecting the power level of each of the plurality of attenuated narrowband optical signals combined into the second multiplexed polychromatic optical signal.

In accordance with other aspects of this exemplary embodiment of the present invention, the at least one of the second plurality of narrowband optical signals is beneficially attenuated so as to equalize the power in each of the second plurality of narrowband optical signals.

In accordance with further aspects of this exemplary embodiment of the present invention, the power of the second multiplexed polychromatic optical signal is beneficially adjustably amplified based upon the detected power level of each of the plurality of attenuated narrowband optical signals.

In accordance with still further aspects of this exemplary embodiment of the present invention, the second plurality of narrowband optical signals comprises at least a portion of the first plurality of narrowband optical signals. That is, at least one of the first plurality of narrowband optical signals may beneficially be switched such that the at least one switched narrowband optical signal is routed through the optical power managed network node. Also, at least one of the first plurality of narrowband optical signals may beneficially be switched such that the at least one switched narrowband optical signal is routed to a local sub-node. Further, at least one of a third plurality of narrowband optical signals may beneficially be received for routing through the optical power managed network node. Thus, the second plurality of narrowband optical signals comprises those of the first plurality of narrowband optical signals and the third plurality of narrowband optical signals that are routed through the optical power managed network node. It should be noted that the power of the at least one of the third plurality of narrowband optical signals may be beneficially controlled based upon the detected power level of each of the plurality of attenuated narrowband optical signals.

In accordance with still further aspects of this exemplary embodiment of the present invention, the power level of each of the first plurality of narrowband optical signals contained within the first multiplexed polychromatic optical signal may beneficially be detected along with the power level of each of the plurality of attenuated narrowband optical signals combined into the second multiplexed polychromatic optical signal. Alternatively, the power level of each of the first plurality of narrowband optical signals contained within the first multiplexed polychromatic optical signal may beneficially be detected separately from the power level of each of the plurality of attenuated narrowband optical signals combined into the second multiplexed polychromatic optical signal.

In still another exemplary embodiment, the technique is realized as an optical power managed network node comprising a demultiplexing device for separating a first multiplexed polychromatic optical signal into a first plurality of narrowband optical signals. The optical power managed network node also comprises a switching device for switching the first plurality of narrowband optical signals and a third plurality of narrowband optical signals according to a predetermined signal routing scheme so as to generate a second plurality of narrowband optical signals. The optical power managed network node further comprises a plurality of attenuators for attenuating the power of at least one of the second plurality of narrowband optical signals so as to generate a plurality of attenuated narrowband optical signals, wherein the power of the at least one of the second plurality of narrowband optical signals is attenuated based upon a power level of each of the plurality of attenuated narrowband optical signals. The optical power managed network node still further comprises a dense wavelength division multiplexing device for combining the plurality of attenuated narrowband optical signals into a second multiplexed polychromatic optical signal. The optical power managed network node still further comprises an adjustable power amplifier for adjustably amplifying the power of the second multiplexed polychromatic optical signal so as to generate an amplified multiplexed polychromatic optical signal containing the plurality of attenuated narrowband optical signals, wherein the power of the second multiplexed polychromatic optical signal is adjustably amplified based upon the power level of each of the plurality of attenuated narrowband optical signals. The optical power managed network node still further comprises a wavelength-selective optical power detector for detecting the power level of each of the plurality of attenuated narrowband optical signals contained in the amplified multiplexed polychromatic optical signal, and for detecting the power level of each of the first plurality of narrowband optical signals contained within the first multiplexed polychromatic optical signal. The optical power managed network node additionally comprises a controller for controlling the power attenuation of the at least one of the second plurality of narrowband optical signals and the power of at least one of the third plurality of narrowband optical signals based upon the detected power level of each of the plurality of attenuated narrowband optical signals.

The present invention will now be described in more detail with reference to exemplary embodiments thereof as shown in the appended drawings.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

Figure 1:
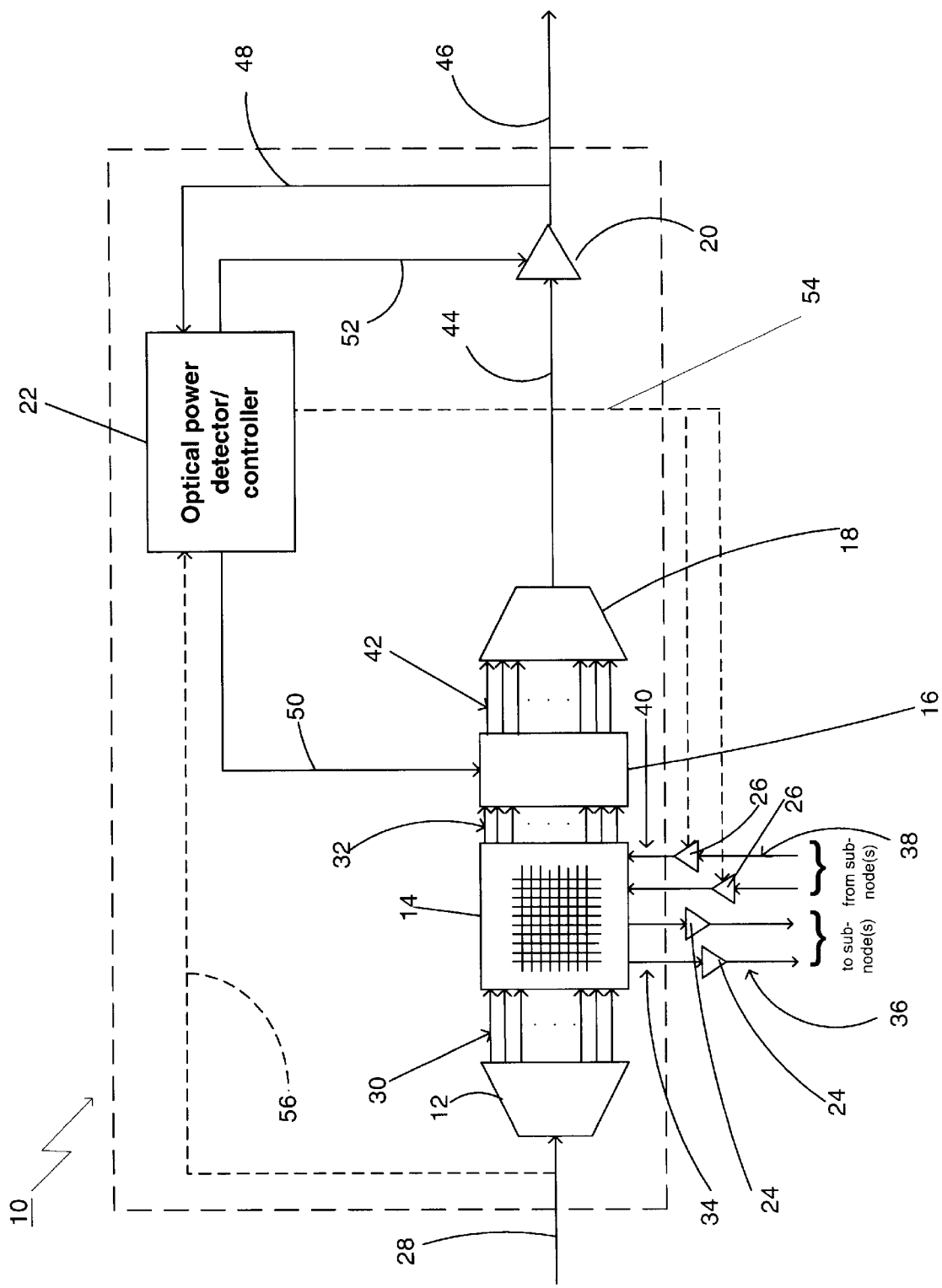
FIG. 1 is a schematic diagram of a preferred embodiment of an optical power managed network node for processing dense wavelength division multiplexed optical signals in accordance with the present invention.

Referring to FIG. 1, there is shown a schematic diagram of a preferred embodiment of an optical power managed network node 10 for processing dense wavelength division multiplexed optical signals in accordance with the present invention. The optical power managed network node 10 comprises a demultiplexing device 12, a switching device 14, a plurality of variable optical attenuators 16, a multiplexing device 18, a variable optical amplifier or gain element 20, a wavelength-selective optical power detector/controller 22, a first plurality of optical receivers/transmitters 24, and a second plurality of optical transmitters/receivers 26. The optical power managed network node 10 operates, through its aforementioned constituent parts, as follows.

The demultiplexing device 12 receives a first dense wavelength division multiplexed (DWDM) polychromatic optical signal on an optical input fiber 28. The first DWDM polychromatic optical signal contains a first plurality of narrowband optical signals, each carrying a unique channel of transmitted data. The demultiplexing device 12 separates the first DWDM polychromatic optical signal into the first plurality of narrowband optical signals contained therein and forwards each of the first plurality of narrowband optical signals to the switching device 14 along a corresponding plurality of optical fibers 30.

The switching device 14 switches the first plurality of narrowband optical signals according to some signal routing scheme. That is, each of the first plurality of narrowband optical signals either pass through the switching device 14 so as to be output from the switching device 14 on one of a plurality of optical fibers 32, or are "dropped" by the optical power managed network node 10, and hence from the network to which the optical power managed network node 10 is connected. Those narrowband optical signals that are "dropped" by the optical power managed network node 10 are output from the switching device 14 on optical fibers 34, which are connected to the first plurality of optical receivers/transmitters 24. The first plurality of optical receivers/transmitters 24 transmit the narrowband optical signals received on optical fibers 34 to one or more sub-nodes (not shown) via output optical fibers 36. Of course, the optical fibers 34 that carry the narrowband optical signals from the optical power managed network node 10 could extend all the way to the one or more sub-nodes (not shown), thereby alleviating the need for the first plurality of optical receivers/transmitters 24.

The second plurality of optical receivers/transmitters 26 may or may not be connected to the same sub-nodes as the first plurality of optical receivers/transmitters 24. In any event, the second plurality of optical receivers/transmitters 26 receive narrowband optical signals from one or more sub-nodes (not shown) on input optical fibers 38. The second plurality of optical receivers/transmitters 26 transmit the narrowband optical signals received on input optical fibers 38 to the switching device 14 via optical fibers 40. Of course, as with the optical fibers 34 that carry the narrowband optical signals from the optical power managed network node 10, the optical fibers 40 that carry the narrowband optical signals to the optical power managed network node 10 could extend all the way from the one or more sub-nodes (not shown), thereby alleviating the need for the second plurality of optical receivers/transmitters 26.

The switching device 14 "adds" the narrowband optical signals received on optical fibers 40 to the network to which the optical power managed network node 10 is connected. That is, the switching device 14 includes the narrowband optical signals received on optical fibers 40 with those narrowband optical signals from the first plurality of narrowband optical signals that pass through the switching device 14 and are output from the switching device 14 on one of the plurality of optical fibers 32. Thus, the plurality of optical fibers 32 carry a second plurality of narrowband optical signals comprised of the narrowband optical signals from the first plurality of narrowband optical signals that pass through the switching device 14 (i.e., those of the first plurality of narrowband optical signals that are not "dropped" by the optical power managed network node 10), as well as the "added" narrowband optical signals received at the switching device 14 on optical fibers 40.

At this point it should be noted that the switching device 14 can be, for example, a switch matrix or some other type of fixed or dynamic optical signal switching element.

The plurality of optical fibers 32 carry the second plurality of narrowband optical signals to the plurality of variable optical attenuators 16. As described in more detail below, the plurality of variable optical attenuators 16 act to equalize the power level of each of the second plurality of narrowband optical signals based upon the detected power level of each of the second plurality of narrowband optical signals after they have been multiplexed by the multiplexing device 18 and amplified by the variable optical amplifier or gain element 20. Thus, at this point, suffice it to say that the plurality of variable optical attenuators 16 act to equalize the power level of each of the second plurality of narrowband optical signals prior to being multiplexed by the multiplexing device 18. The plurality of variable optical attenuators 16 thus provide an attenuated version of the second plurality of narrowband optical signals to the multiplexing device 18 via a plurality of optical fibers 42.

As mentioned above, the multiplexing device 18 combines the attenuated version of the second plurality of narrowband optical signals into a second dense wavelength division multiplexed (DWDM) polychromatic optical signal and forwards this second DWDM polychromatic optical signal to the variable optical amplifier or gain element 20 on an optical output fiber 44. As described in more detail below, the variable optical amplifier or gain element 20 amplifies this second DWDM polychromatic optical signal based upon the detected power level of each of the second plurality of narrowband optical signals contained in the second DWDM polychromatic optical signal (i.e., after attenuation by the plurality of variable optical attenuators 16 and multiplexing by the multiplexing device 18). The variable optical amplifier or gain element 20 thus provides an amplified version of the second DWDM polychromatic optical signal on output optical fiber 46. At this point it should be noted that the variable optical amplifier or gain element 20 could be, for example, an erbium doped fiber amplifier (EDFA), an erbium doped waveguide amplifier (EDWA), a Raman amplifier, or some other type of variable optical amplifier or gain element.

The wavelength-selective optical power detector/controller 22 taps a portion of the amplified version of the second DWDM polychromatic optical signal being carried on output optical fiber 46 via an optical tap fiber 48 so as to detect the power level of each of the second plurality of narrowband optical signals contained in the second DWDM polychromatic optical signal (i.e., after attenuation by the plurality of variable optical attenuators 16 and multiplexing by the multiplexing device 18). One technique for accomplishing this power detection function is described in related U.S. patent application Ser. No. 09/578,721, filed May 26, 2000, which has previously been incorporated by reference herein in its entirety.

After determining the power level of each of the second plurality of narrowband optical signals contained in the second DWDM polychromatic optical signal (i.e., after attenuation by the plurality of variable optical attenuators 16 and multiplexing by the multiplexing device 18), the wavelength-selective optical power detector/controller 22 provides one or more first power control signals to the plurality of variable optical attenuators 16 on a first power control signal line/bus 50, and provides a second power control signal to the variable optical amplifier or gain element 20 on a second power control signal line/bus 52. These first and second power control signals allow the power level of the amplified version of the second DWDM polychromatic optical signal on output optical fiber 46 to be controlled such that the amplified version of the second DWDM polychromatic optical signal on output optical fiber 46 is always at a constant power level. Thus, the optical power managed network node 10 always provides a constant power level DWDM polychromatic optical output signal. This constant power level DWDM polychromatic optical output signal provided by the optical power managed network node 10 is probably most beneficial when it matches the power level of the first DWDM polychromatic optical signal on the optical input fiber 28, thereby resulting in the optical power managed network node 10 having a zero decibel (dB) level loss. Thus, the present invention optical power managed network node 10 alleviates the need for manual network initialization procedures whenever additional optical signals are added to a network, existing optical signals are dropped from a network, or a network is otherwise reconfigured in some manner (e.g., an additional optical add/drop network node is added to a network, an existing optical add/drop network node is removed from a network, etc.).

At this point it should be noted that the wavelength-selective optical power detector/controller 22 may also provide a third power control signal to the second plurality of optical receivers/transmitters 26 on a third power control signal line/bus 54 so as to control the power level of the second plurality of optical receivers/transmitters 26 which transmit the narrowband optical signals received on input optical fibers 38 to the switching device 14 via optical fibers 40. This additional aspect of power level control in accordance with the present invention may be beneficial in that the second plurality of optical receivers/transmitters 26 may be of a lower power variety, thereby requiring less cost.

At this point it should be noted that the wavelength-selective optical power detector/controller 22 may also tap a portion of the first DWDM polychromatic optical signal being carried on optical input fiber 28 via an optical tap fiber 56 so as to detect the power level of each of the first plurality of narrowband optical signals contained in the first DWDM polychromatic optical signal. This additional aspect of power level control in accordance with the present invention may be beneficial in that the power level of each of the first plurality of narrowband optical signals contained in the first DWDM polychromatic optical signal may be detected so as to determine if any failures have occurred in the network.

Figure 2:
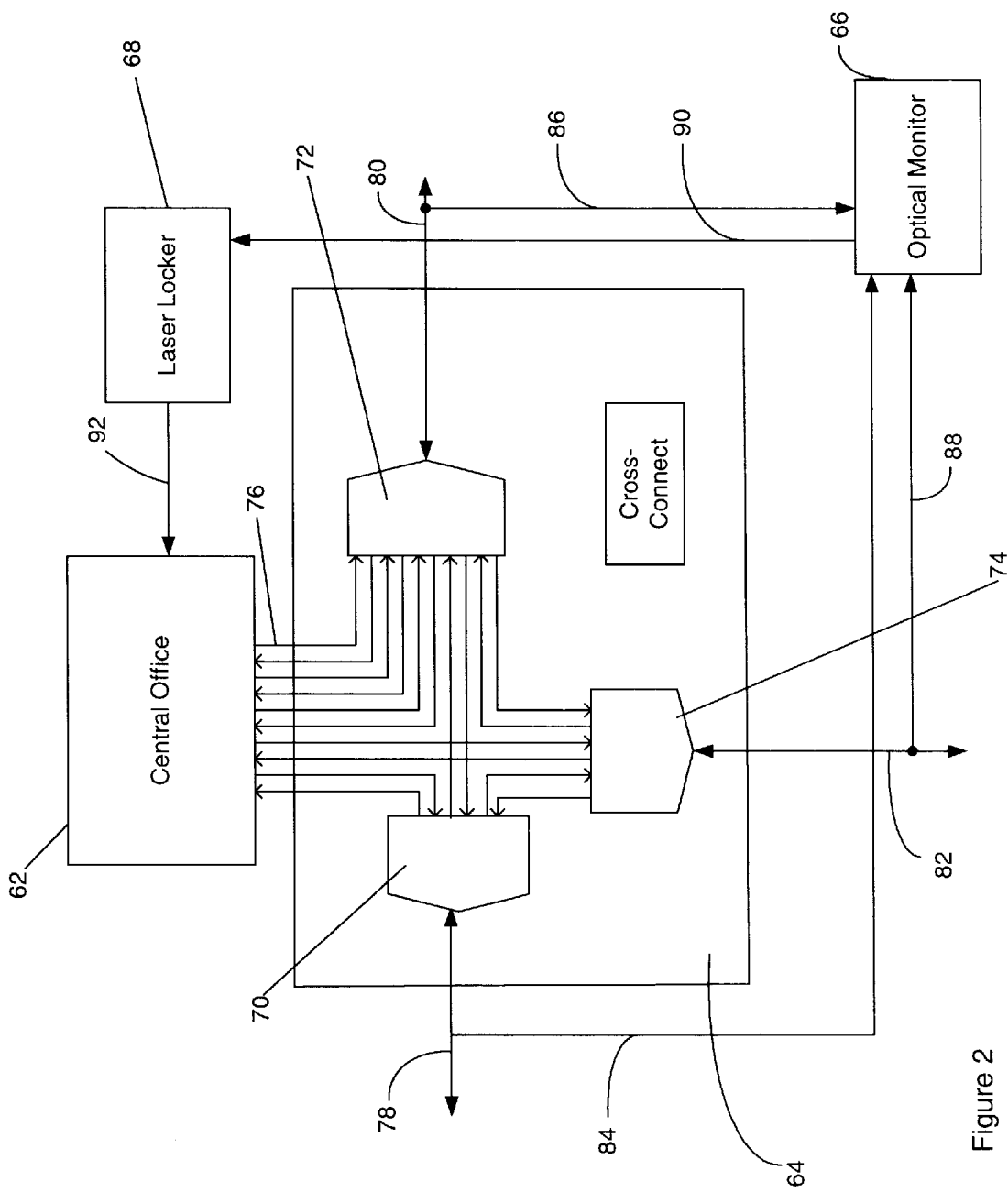
FIG. 2 is a schematic diagram of a preferred embodiment of an optical wavelength control technique in accordance with the present invention.

Referring to FIG. 2, there is shown a schematic diagram of a preferred embodiment of an optical wavelength control system 60 in accordance with the present invention. The optical wavelength control system 60 comprises a central office 62, an optical cross-connect 64, an optical wavelength monitor 66, and a laser locking device 68. The optical wavelength control system 60 operates, through its aforementioned constituent parts, as follows.

The central office 62 receives and transmits a plurality of narrowband optical signals from and to the optical cross-connect via a plurality of optical fibers 76. The plurality of optical fibers 76 connect to a plurality of multiplexing/demultiplexing devices within the optical cross-connect 64. That is, the optical cross-connect 64 includes a first multiplexing/demultiplexing device 70, a second multiplexing/demultiplexing device 72, and a third multiplexing/demultiplexing device 74, each for receiving and transmitting the plurality of narrowband optical signals from and to the central office 62 via the plurality of optical fibers 76. The plurality of multiplexing/demultiplexing devices 70, 72, 74 within the optical cross-connect 64 perform multiplexing functions on the plurality of narrowband optical signals received from the central office 62 so as to generate dense wavelength division multiplexed (DWDM) polychromatic optical signals transmitted on optical fibers 78, 80, 82, respectively. The plurality of multiplexing/demultiplexing devices 70, 72, 74 within the optical cross-connect 64 also perform demultiplexing functions on DWDM polychromatic optical signals received on optical fibers 78, 80, 82, respectively, so as to generate the plurality of narrowband optical signals transmitted to the central office 62.

Similar to the wavelength-selective optical power detector/controller 22 of FIG. 1, the optical wavelength monitor 66 of FIG. 2 taps a portion of the DWDM polychromatic optical signals being carried on each of the optical fibers 78, 80, 82 via optical tap fibers 84, 86, 88, respectively, so as to detect the wavelength of each of the plurality of narrowband optical signals contained in all of the DWDM polychromatic optical signals. One technique for accomplishing this wavelength monitoring function is described in related U.S. patent application Ser. No. 09/578,721, filed May 26, 2000, which has previously been incorporated by reference herein in its entirety.

The optical wavelength monitor 66 provides an indication of the wavelength of each of the plurality of narrowband optical signals contained in all of the DWDM polychromatic optical signals to the laser locking device 68 via one or more wavelength indicator lines 90. The laser locking device 68 in turn provides one or more laser control signals to the central office 62 via laser control lines 92. These laser control signals provide a mechanism for controlling the accuracy of the wavelengths of each of the plurality of narrowband optical signals transmitted from the central office 62. Thus, the optical wavelength control system 60 insures that wavelength accuracy is maintained within the system.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. An optical power managed network node for processing dense wavelength division multiplexed signals comprising:

a demultiplexing device for separating a first multiplexed polychromatic optical signal into a first plurality of narrowband optical signals;

a switching device for switching the first plurality of narrowband optical signals according to a predetermined signal routing scheme so as to generate a second plurality of narrowband optical signals;

a plurality of attenuators for attenuating the power of at least one of the second plurality of narrowband optical signals so as to generate a third plurality of narrowband optical signals, wherein the power of the at least one of the second plurality of narrowband optical signals is attenuated based upon a detected power level of each of the third plurality of narrowband optical signals;

a dense wavelength division multiplexing device for combining the third plurality of narrowband optical signals into a second multiplexed polychromatic optical signal;

a wavelength-selective optical power detector for detecting the power level of each of the third plurality of narrowband optical signals combined into the second multiplexed polychromatic optical signal; and a controller for controlling the power attenuation of the at least one of the second plurality of narrowband optical signals based upon the detected power level of each of the third plurality of narrowband optical signals.

2. The optical power managed network node as defined in claim 1, further comprising:

an adjustable power amplifier for adjustably amplifying the power of the second multiplexed polychromatic optical signal based upon the detected power level of each of the plurality of attenuated narrowband optical signals.

3. The optical power managed network node as defined in claim 1, wherein the at least one of the second plurality of narrowband optical signals is attenuated so as to equalize the power in each of the second plurality of narrowband optical signals.

4. The optical power managed network node as defined in claim 1, wherein the second plurality of narrowband optical signals comprises at least a portion of the first plurality of narrowband optical signals.

5. The optical power managed network node as defined in claim 4, wherein at least one of the first plurality of narrowband optical signals is switched such that the at least one switched narrowband optical signal is routed to a local sub-node.

6. The optical power managed network node as defined in claim 4, wherein at least one of the first plurality of narrowband optical signals is switched such that the at least one switched narrowband optical signal is routed through the optical power managed network node.

7. The optical power managed network node as defined in claim 6, wherein the switching device receives at least one of a third plurality of narrowband optical signals for routing through the optical power managed network node.

8. The optical power managed network node as defined in claim 7, wherein the second plurality of narrowband optical signals comprises those of the first plurality of narrowband optical signals and the third plurality of narrowband optical signals that are routed through the optical power managed network node.

9. The optical power managed network node as defined in claim 7, further comprising:

a controller for controlling the power of the at least one of the third plurality of narrowband optical signals based upon the detected power level of each of the plurality of attenuated narrowband optical signals.

10. The optical power managed network node as defined in claim 1, wherein the wavelength-selective optical power detector also detects the power level of each of the first plurality of narrowband optical signals contained within the first multiplexed polychromatic optical signal.

11. The optical power managed network node as defined in claim 1, wherein the wavelength-selective optical power detector is a first wavelength-selective optical power detector, further comprising:

a second wavelength-selective optical power detector for detecting the power level of each of the first plurality of narrowband optical signals contained within the first multiplexed polychromatic optical signal.

12. A method for processing dense wavelength division multiplexed signals in an optical power managed network node, the method comprising the steps of:

separating a first multiplexed polychromatic optical signal into a first plurality of narrowband optical signals;

switching the first plurality of narrowband optical signals according to a predetermined signal routing scheme so as to generate a second plurality of narrowband optical signals;

attenuating the power of at least one of the second plurality of narrowband optical signals so as to generate a third plurality of narrowband optical signals, wherein the power of the at least one of the second plurality of narrowband optical signals is attenuated based upon a detected power level of each of the third plurality of narrowband optical signals;

combining the third plurality of narrowband optical signals into a second multiplexed polychromatic optical signal;

detecting the power level of each of the third plurality of narrowband optical signals combined into the second multiplexed polychromatic optical signal; and controlling the power attenuation of the at least one of the second plurality of narrowband optical signals based upon the detected power level of each of the third plurality of narrowband optical signals.

13. The method as defined in claim 12, further comprising the step of:

adjustably amplifying the power of the second multiplexed polychromatic optical signal based upon the detected power level of each of the plurality of attenuated narrowband optical signals.

14. The method as defined in claim 12, wherein the at least one of the second plurality of narrowband optical signals is attenuated so as to equalize the power in each of the second plurality of narrowband optical signals.

15. The method as defined in claim 12, wherein the second plurality of narrowband optical signals comprises at least a portion of the first plurality of narrowband optical signals.

16. The method as defined in claim 15, wherein at least one of the first plurality of narrowband optical signals is switched such that the at least one switched narrowband optical signal is routed to a local sub-node.

17. The method as defined in claim 15, wherein at least one of the first plurality of narrowband optical signals is switched such that the at least one switched narrowband optical signal is routed through the optical power managed network node.

18. The method as defined in claim 17, further comprising the step of:

receiving at least one of a third plurality of narrowband optical signals for routing through the optical power managed network node.

19. The method as defined in claim 18, wherein the second plurality of narrowband optical signals comprises those of the first plurality of narrowband optical signals and the third plurality of narrowband optical signals that are routed through the optical power managed network node.

20. The method as defined in claim 18, further comprising the step of:

controlling the power of the at least one of the third plurality of narrowband optical signals based upon the detected power level of each of the plurality of attenuated narrowband optical signals.

21. The method as defined in claim 12, wherein the step of detecting includes detecting the power level of each of the first plurality of narrowband optical signals contained within the first multiplexed polychromatic optical signal.

22. The method as defined in claim 12, further comprising the step of:

detecting the power level of each of the first plurality of narrowband optical signals contained within the first multiplexed polychromatic optical signal.

23. An optical power managed network node for processing dense wavelength division multiplexed signals comprising:

a demultiplexing device for separating a first multiplexed polychromatic optical signal into a first plurality of narrowband optical signals;

a switching device for switching the first plurality of narrowband optical signals and a third plurality of narrowband optical signals according to a predetermined signal routing scheme so as to generate a second plurality of narrowband optical signals;

a plurality of attenuators for attenuating the power of at least one of the second plurality of narrowband optical signals so as to generate a plurality of attenuated narrowband optical signals, wherein the power of the at least one of the second plurality of narrowband optical signals is attenuated based upon a power level of each of the plurality of attenuated narrowband optical signals;

a dense wavelength division multiplexing device for combining the plurality of attenuated narrowband optical signals into a second multiplexed polychromatic optical signal;

an adjustable power amplifier for adjustably amplifying the power of the second multiplexed polychromatic optical signal so as to generate an amplified multiplexed polychromatic optical signal containing the plurality of attenuated narrowband optical signals, wherein the power of the second multiplexed polychromatic optical signal is adjustably amplified based upon the power level of each of the plurality of attenuated narrowband optical signals;

a wavelength-selective optical power detector for detecting the power level of each of the plurality of attenuated narrowband optical signals contained in the amplified multiplexed polychromatic optical signal, and for detecting the power level of each of the first plurality of narrowband optical signals contained within the first multiplexed polychromatic optical signal;

a controller for controlling the power attenuation of the at least one of the second plurality of narrowband optical signals and the power of at least one of the third plurality of narrowband optical signals based upon the detected power level of each of the plurality of attenuated narrowband optical signals.

* * * * *